United States Patent
Ullrich et al.

(10) Patent No.: US 10,922,190 B1
(45) Date of Patent: *Feb. 16, 2021

(54) UPDATING DATABASE RECORDS WHILE MAINTAINING ACCESSIBLE TEMPORAL HISTORY

(71) Applicant: INTUIT INC., Mountain View, CA (US)

(72) Inventors: Tobias Ullrich, Muenster (DE); Lars Pfannenschmidt, Muenster (DE); Frank Wisniewski, Muenster (DE); Thorsten Kruger, Muenster (DE); Shabbir Y. Rajgara, Sunnyvale, CA (US); Guohan Gao, San Jose, CA (US)

(73) Assignee: INTUIT, INC., Mountain View, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/147,050

(22) Filed: Sep. 28, 2018

Related U.S. Application Data

(63) Continuation of application No. 14/928,869, filed on Oct. 30, 2015, now Pat. No. 10,114,704.

(51) Int. Cl.
*G06F 16/23* (2019.01)
*G06F 11/14* (2006.01)

(52) U.S. Cl.
CPC ...... *G06F 11/1464* (2013.01); *G06F 16/2358* (2019.01); *G06F 2201/87* (2013.01)

(58) Field of Classification Search
CPC .................................................. G06F 16/2358
See application file for complete search history.

(56) References Cited

U.S. PATENT DOCUMENTS

| | | |
|---|---|---|
| 9,875,028 B2 | 1/2018 | Patterson |
| 2006/0036676 A1 | 2/2006 | Cardone et al. |
| 2008/0195677 A1 | 8/2008 | Sudhakar et al. |
| 2013/0131840 A1 | 5/2013 | Govindaraj et al. |

*Primary Examiner* — Kris E Mackes
(74) *Attorney, Agent, or Firm* — Patterson & Sheridan, LLP

(57) ABSTRACT

Certain aspects of the present disclosure provide techniques for updating database records while maintaining accessible temporal history. One example method generally includes receiving a request, at a database, to select an instance of a record from the database at a specific point in time and reading the instance of the record from a snapshot of the database. The method further includes loading one or more deltas associated with the record from the database and chronologically applying the one or more deltas to the instance of the record to create the instance of the record. The method further includes returning the instance of the record, determining that the request has made a percentage of recent requests exceed a threshold for requests for most-current data and creating a new snapshot of the database.

20 Claims, 6 Drawing Sheets

STREAMS TABLE 210

| STREAM | REVISION | TYPE | REVISION | TYPE | ... |
|---|---|---|---|---|---|
| | EVENT | | EVENT | | |

FIG. 2

SNAPSHOTS TABLE 230

| STREAM | REVISION | SNAPSHOT DATA |
|---|---|---|
| [ENTITY ID] | [LONG] | [AVRO BLOB] |

FIG. 3

UPDATING DATABASE RECORDS WHILE MAINTAINING ACCESSIBLE TEMPORAL HISTORY

CROSS-REFERENCE TO RELATED APPLICATIONS

This application is a continuation of U.S. Patent Application Ser. No. 14/928,869, filed on Oct. 30, 2015, which is herein incorporated by reference in its entirety.

INTRODUCTION

Related Art

The disclosed embodiments relate to techniques for storing and updating information in databases. More specifically, the disclosed embodiments relate to updating database records while maintaining accessible temporal history.

With the ever-increasing trend toward connected technologies and information sharing, coupled with the decreasing costs of storage media, many organizations are maintaining increasingly large databases to keep track of every bit of information that they can gather. This information is typically maintained in transaction-aware database structures. As new information is collected, records are added to the database, or are updated if a prior version of the record already exists. In addition, records are occasionally deleted from the database for various reasons. Furthermore, transaction logs are typically kept for various purposes, such as auditing and disaster recovery.

While these complex databases are very useful in storing vast quantities of data for quick access, they do have a number of shortcomings. For example, if someone wanted to view the state of a particular record at a particular moment in time, that person would typically have to load the transaction log between the time in question and the current record, and scan forward from the time in question to the current record to see all of the changes made to the record from the time in question to the current record. Once all of the changes have been captured, the record could be recreated by rolling back each transaction affecting the record in reverse chronological order until the time in question is reached.

Another way of viewing the state of a particular record at a particular moment in time would be to start with a known database state, such as a backup, and traversing the transaction log until the time in question to capture all of the changes to the particular record. However, both of these methods require quite a bit of computing resources and time to accomplish. In many instances, these methods are only available to system administrators, and product end-users—the individuals most likely to want this temporal information—are told the information is not available. Thus, every time a record is updated in the database, some information available to the product end-user is lost.

Hence, what is needed is a method and an apparatus that facilitates temporal database access without the above-described problems.

SUMMARY

The disclosed embodiments provide a system for updating database records while maintaining accessible temporal history. The system operates by receiving a request, at a database, to select a specific instance of a record from the database at a specific point in time. In response to the request, the system reads an instance of the record from a snapshot of the database, wherein the snapshot of the database was made prior to the specific point in time. Next, the system loads one or more deltas associated with the record from the database, wherein each delta in the one or more deltas comprises the difference between a new state of the record and a prior state of the record. The system then chronologically applies the one or more deltas to the instance of the record to create the specific instance of the record. Finally, the system returns the specific instance of the record.

In some embodiments, the system periodically creates a new snapshot of the database. The system accomplishes this by first loading a most recent snapshot of the database. Next, the system loads a complete set of deltas associated with the database from a time of the most recent snapshot to a current time. Finally, the system applies to the database the complete set of deltas associated with the database from the time of the most recent snapshot to the current time.

In some embodiments, the system applies an update to the record by selecting a most recent instance of the record from the database, determining a delta between the update to the record and the most recent instance of the record, and saving at the database the delta between the update to the record and the most recent instance of the record.

In some embodiments, saving at the database the delta between the update to the record and the most recent instance of the record further involves the system additionally saving metadata associated with the update to the record.

In some embodiments, the metadata comprises an identifier for a client that requested the update to the record.

In some embodiments, saving at the database the delta between the update to the record and the most recent instance of the record further involves the system saving a time of the delta between the update to the record and the most recent instance of the record.

In some embodiments, saving at the database the delta between the update to the record and the most recent instance of the record further involves the system incrementing a count of the number of deltas since a most recent snapshot of the database.

In some embodiments, the system creates a new snapshot of the database when the count of the number of deltas since a most recent snapshot of the database exceeds a predetermined threshold.

In some embodiments, the system creates the new snapshot of the database when a predetermined amount of time has elapsed since a previous snapshot of the database was created.

In some embodiments, the system creates the new snapshot of the database when a collective size of the deltas since a previous snapshot of the database was created exceeds a predetermined threshold.

In some embodiments, the system creates the new snapshot of the database if more than a predetermined percentage of recent requests are requesting most-current data.

BRIEF DESCRIPTION OF THE DRAWINGS

FIG. 2 shows a streams table that comprises deltas in accordance with the disclosed embodiments.

FIG. 3 shows a snapshots table that comprises snapshots in accordance with the disclosed embodiments.

In the figures, like reference numerals refer to the same figure elements.

DETAILED DESCRIPTION

Figure 1:
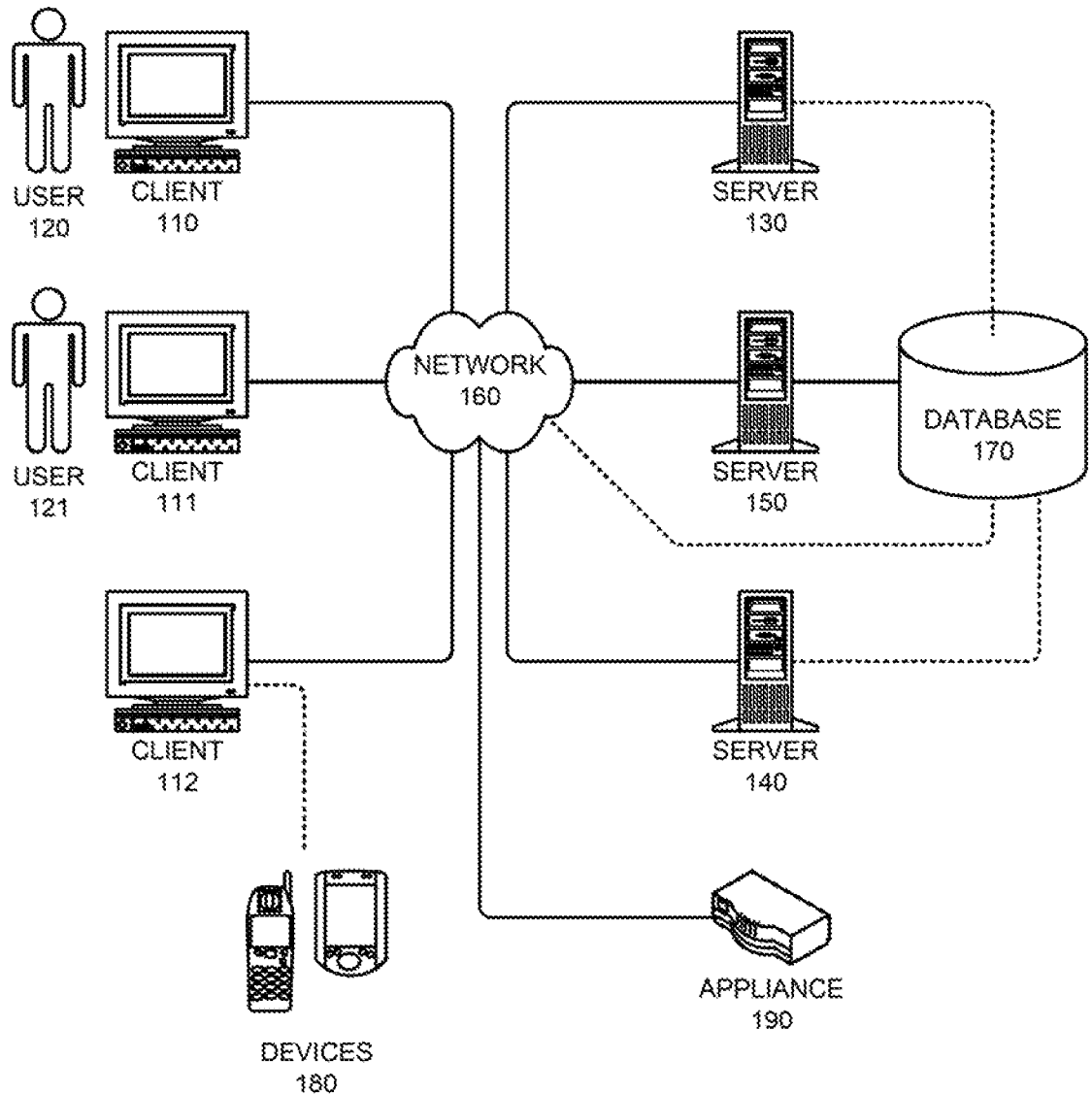
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a system for updating database records while maintaining accessible temporal history. In other words, an application or a user may request a particular record as it existed at a particular point in time. For example, a user may want to see a company profile record as it existed at the end of a previous fiscal year, or a billing address record for a payee as it existed when a specific payment was sent. This temporal information is maintained in an available state. The user may query the information, including a time frame for the information, from the database and receive the result in near real-time without any administrative actions such as loading older backups or transaction log files.

The system fulfills requests at the database to select a specific instance of a record from the database at a specific point in time, or within a particular range of time by reading an instance of the record from a snapshot of the database, wherein the snapshot of the database was made prior to the specific point in time. Next, the system loads one or more deltas associated with the record from the database, wherein each delta in the one or more deltas comprises the difference between a new state of the record and a prior state of the record. The system then chronologically applies the one or more deltas to the instance of the record to create the specific instance of the record.

Updates are made to the record by selecting a most recent instance of the record from the database, determining a delta between the update to the record and the most recent instance of the record, and saving at the database the delta between the update to the record and the most recent instance of the record. Thus, the production database may have many snapshots and a stream of deltas such that the entire state of the database may be determined for any particular point in time by reading the immediately prior snapshot and all of the deltas up to that particular point in time.

In addition to the updates themselves, additional metadata associated with the updates may be stored along with the deltas. For example, an identifier for the application that requested the update, and other contextual information may be stored along with the delta. This may aid a user in determining a motivation for the update and may help explain why the update was made. In essence, storing the deltas with timing information and metadata gives the end user a much bigger picture into what is happening with the data than what a user can gain from looking at a current state of a transactional database.

Consider the situation with a standard transactional database where a user decides to cancel a service. Typically, the service is cancelled and the service related records are deleted. In this example, a user cannot look at the database and determine what happened. The records are gone. However, with embodiments that utilize snapshots with stored deltas and metadata, a user can browse back through history and get a fuller picture of what was going on just before the user cancelled the service.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network. In some embodiments of the present invention, database 170 updates database records while maintaining accessible temporal history, as described herein.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160. In some embodiments of the present invention, portions of database 170 are implemented within appliance 190.

Note that different embodiments of the present invention may use different system configurations, and are not limited to the system configuration illustrated in computing environment 100. In general, any device that is capable of communicating via network 160 may incorporate elements of the present invention.

In an exemplary embodiment of the present invention, deltas and snapshots are stored as follows. FIG. 2 shows a streams table 210 that comprises deltas in accordance with the disclosed embodiments. FIG. 3 shows a snapshots table 230 that comprises snapshots in accordance with the disclosed embodiments. Streams table 210 has a primary key of (stream, revision). Note that this is the usual table that comprises the event stream for entities. In one embodiment, streams table 210 comprises one stream per row, using Cassandra's wide rows. Note that while the description herein discusses Cassandra, any database management system may be used with embodiments of the present invention.

Snapshots table 230 stores snapshots for entities. In some embodiments, each snapshot is stored with stream as a partition key, and revision as cluster order. Note that "revision" is essentially the count of changes that occurred to the entity, and may also contain information about the time the changes occurred. The following is an example of revisions number one and two in a stream called 95c82e4e-2706-41e7-adc9-39e37cfe8c06:

{
"type": "created",
"correlationId": "ba10592d-3bae-4af4-9a17-23caeaa82f85",
"entityId": "95c82e4e-2706-41e7-adc9-39e37cfe8c06",
"eventId": "713cfbed-93c9-49ad-8745-e7b9391a3ba8",
"headers": [
{
"type": "AppName",
"value": "some_app"
}
]
}
{
"type": "updated",
"correlationId": "ba10592d-3bae-4af4-9a17-23caeaa82f85",
"entityId": "95c82e4e-2706-41e7-adc9-39e37cfe8c06",
"eventId": "818220d7-4d9e-4c60-blea-96aa4adff8ad",
"changes": [
{
"type": "UUID",
"correlationId": "ba10592d-3bae-4af-9a17-23caeaa82f85",
"entityId": "95c82e4e-2706-41e7-adc9-39e37cfe8c06",
"attribute": "test:namespacel:test_attribute",
"value": "some value",
"id": "3b082a52-d3a4-4f69-85ab-0d2e4c942f91"
}
],
"headers": [
{
"type": "AppName",
"value": "some_app"
}
]
}

The example above illustrates a stream that describes an entity (a record) being created and an attribute value set on the entity. CorrelationId is used to correlate this event with the command that came into the system to cause the event. Likewise, the headers are used to carry arbitrary additional information, i.e. metadata. In this case, the ID of the client who issued the command to change the value is stored in the headers. This results in the following "snapshot data" field in the snapshot table for stream=95c82e4e-2706-41e7-adc9-39e37cfe8c06and revision=2:
{
"entityId": "95c82e4e-2706-41e7-adc9-39e37cfe8c06",
"test": {
"namespace1": {
"test_attribute": "some value"
}
}
}

Note that information that is not strictly necessary, e.g. the "AppName" from above, is left out in this form. However, this record is represented as a binary AVRO blob. Note that while AVRO is described herein, any data serialization framework may be used with embodiments of the present invention.

Figure 4:
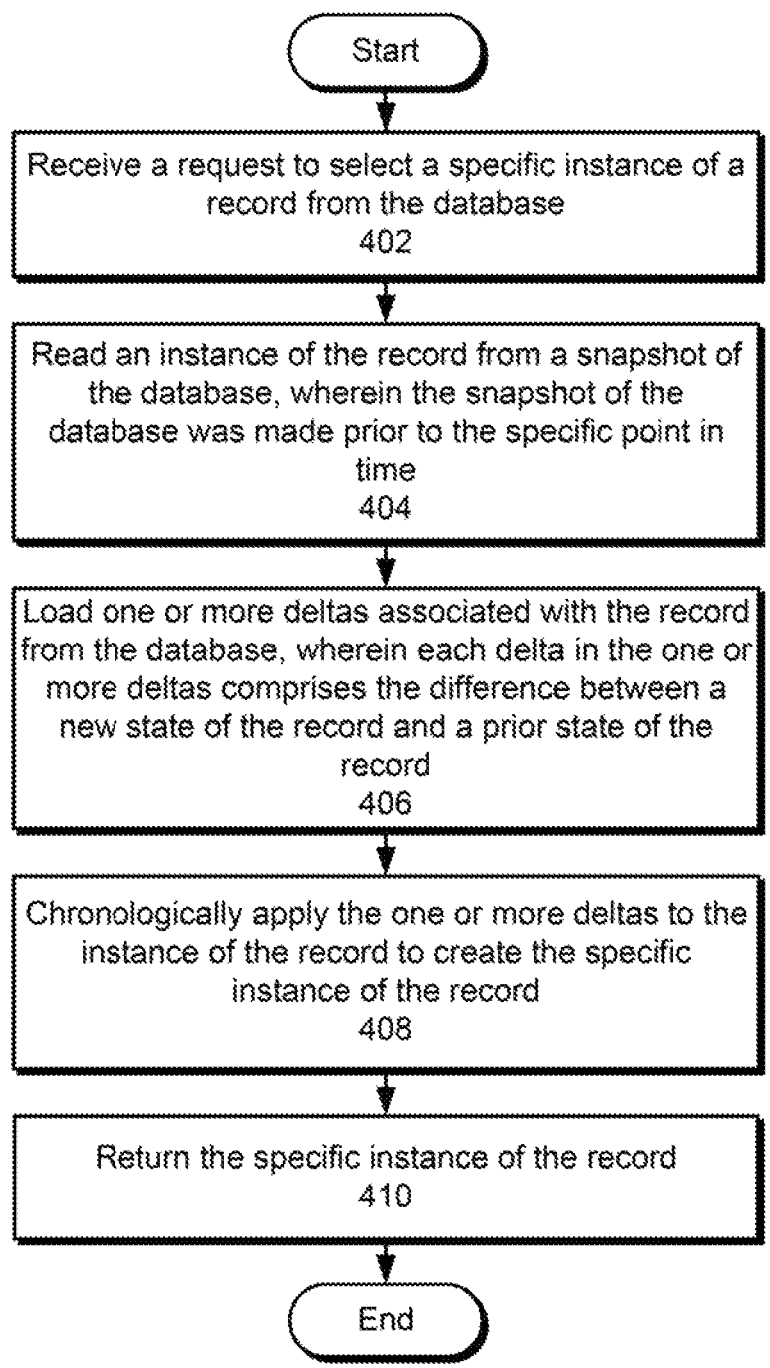
FIG. 4 shows a flowchart illustrating the process of serving records from a database while maintaining accessible temporal history in accordance with the disclosed embodiments.

FIG. 4 shows a flowchart illustrating the process of serving records from database 170 while maintaining accessible temporal history in accordance with the disclosed embodiments. During operation, the system receives a request, at database 170, to select a specific instance of a record from database 170 at a specific point in time (operation 402). In response to the request, the system reads an instance of the record from a snapshot of database 170, wherein the snapshot of database 170 was made prior to the specific point in time (operation 404). Next, the system loads one or more deltas associated with the record from database 170, wherein each delta in the one or more deltas comprises the difference between a new state of the record and a prior state of the record (operation 406). The system then chronologically applies the one or more deltas to the instance of the record to create the specific instance of the record (operation 408). Finally, the system returns the specific instance of the record (operation 410).

Figure 5:
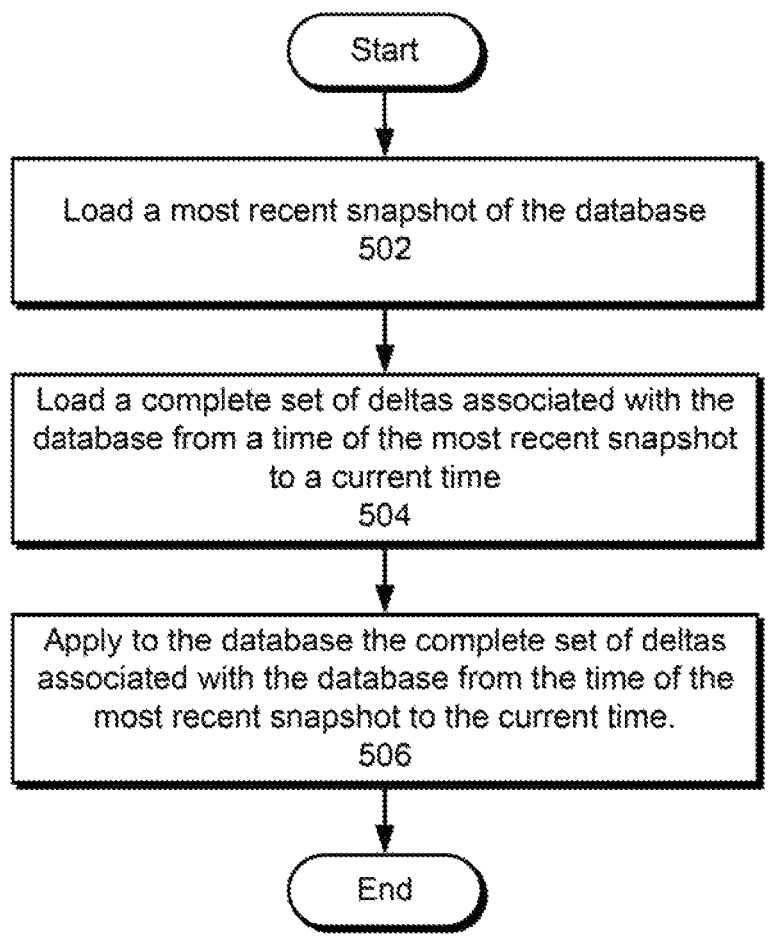
FIG. 5 shows a flowchart illustrating the process of creating a new snapshot of the database in accordance with the disclosed embodiments.

FIG. 5 shows a flowchart illustrating the process of creating a new snapshot of database 170 in accordance with the disclosed embodiments. During operation, the system loads a most recent snapshot of database 170 (operation 502). Next, the system loads a complete set of deltas associated with database 170 from a time of the most recent snapshot to a current time (operation 504). Finally, the system applies to database 170 the complete set of deltas associated with database 170 from the time of the most recent snapshot to the current time (operation 506). Note that, as described previously, the system may create a snapshot of database 170 at any time, including when a certain amount of time has passed, when a collective size of the deltas exceeds a certain threshold, when a count of the deltas exceeds a certain threshold, when administrators calls for a new snapshot, when a predetermined time has been reached, or when a percentage of calls to the database requesting the most current records has exceeded a predetermined threshold.

Figure 6:
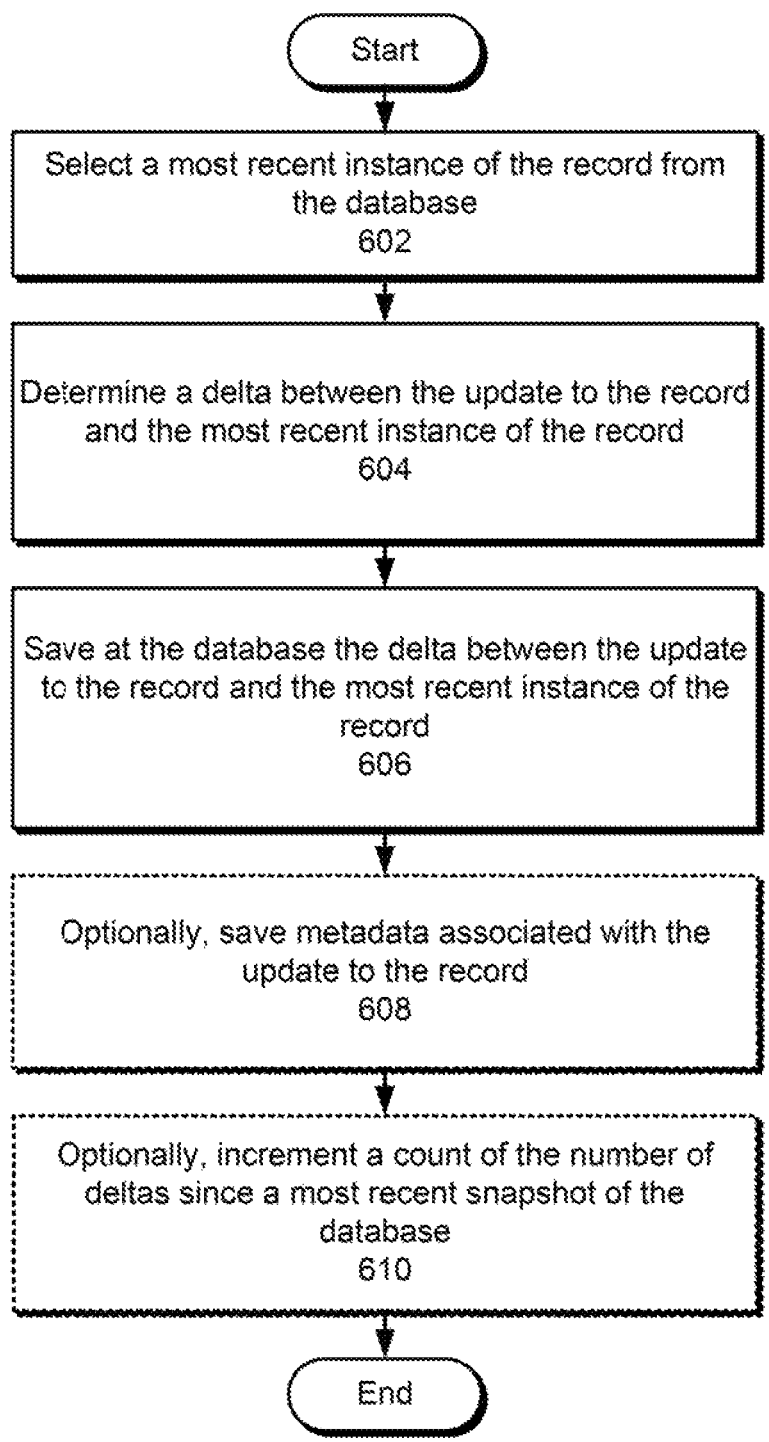
FIG. 6 shows a flowchart illustrating the process of applying a record update in accordance with the disclosed embodiments.

FIG. 6 shows a flowchart illustrating the process of applying a record update in accordance with the disclosed embodiments. During operation, the system selects a most recent instance of the record from database 170 (operation 602). Next, the system determines a delta between the update to the record and the most recent instance of the record (operation 604). Finally, the system saves at database 170 the delta between the update to the record and the most recent instance of the record (operation 606). Optionally, the system also saves metadata associated with the update to the record (operation 608). Note that this metadata may comprise an identifier for a client that requested the update to the record, as well as a time of the delta between the update to the record and the most recent instance of the record. Additionally, the system may also increment a count of the number of deltas since a most recent snapshot of database 170 (operation 610).

Figure 7:
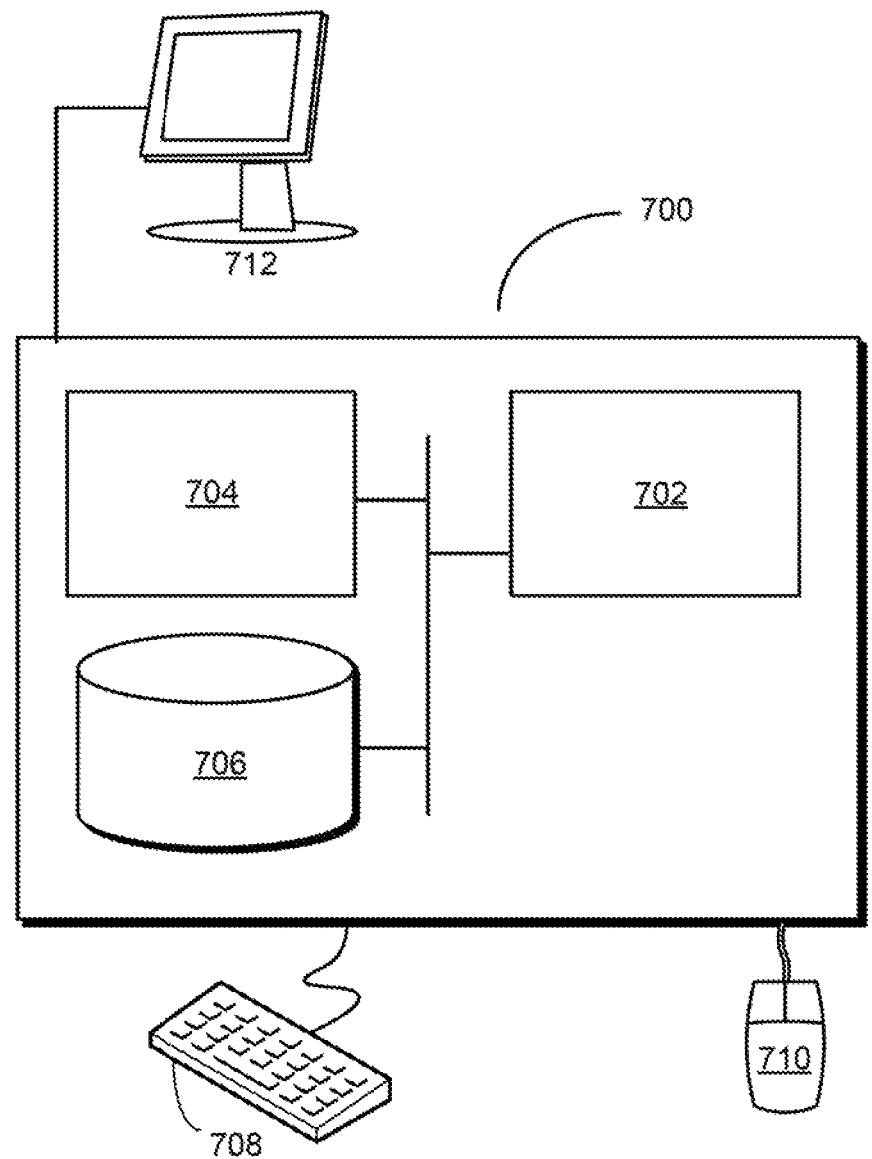
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for updating database records while maintaining accessible temporal history. The system operates by receiving a request, at a database, to select a specific instance of a record from the database at a specific point in time. In response to the request, the system reads an instance of the record from a snapshot of the database, wherein the snapshot of the database was made prior to the specific point in time. Next, the system loads one or more deltas associated with the record from the database, wherein each delta in the one or more deltas comprises the difference between a new state of the record and a prior state of the record. The system then chronologically applies the one or more deltas to the instance of the record to create the specific instance of the record. Finally, the system returns the specific instance of the record.

In addition, one or more components of computer system 700 may be remotely located and connected to the other components over a network. Portions of the present embodiments may also be located on different nodes of a distributed system that implements the embodiments. For example, the present embodiments may be implemented using a cloud computing system that manages the storage of data while maintaining access to the state of the data at any point in time.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for updating database records while maintaining accessible temporal history, comprising:
    receiving a request, at a database, to select an instance of a record from the database at a specific point in time;
    reading the instance of the record from a snapshot of the database, wherein the snapshot of the database was made prior to the specific point in time;
    loading one or more deltas associated with the record from the database, wherein each delta in the one or more deltas comprises a difference between a new state of the record and a prior state of the record;
    chronologically applying the one or more deltas to the instance of the record to create the instance of the record;
    returning the instance of the record;
    determining that the request has made a percentage of recent requests exceed a threshold for requests for most-current data; and
    creating a new snapshot of the database.

2. The method of claim 1, further comprising applying an update to the record by:
    selecting a most recent instance of the record from the database;
    determining a delta between the update to the record and the most recent instance of the record; and
    saving in the database the delta between the update to the record and the most recent instance of the record.

3. The method of claim 2, wherein saving at the database the delta between the update to the record and the most recent instance of the record further involves additionally saving metadata associated with the update to the record.

4. The method of claim 3, wherein the metadata comprises an identifier for a client that requested the update to the record.

5. The method of claim 4, wherein saving at the database the delta between the update to the record and the most recent instance of the record further involves saving a time of the delta between the update to the record and the most recent instance of the record.

6. The method of claim 2, wherein saving at the database the delta between the update to the record and the most recent instance of the record further involves incrementing a count of deltas since a most recent snapshot of the database.

7. The method of claim 6, further comprising creating the new snapshot of the database when the count of deltas since the most recent snapshot of the database exceeds a predetermined threshold.

8. The method of claim 1, further comprising creating the new snapshot of the database when a predetermined amount of time has elapsed since a previous snapshot of the database was created.

9. The method of claim 1, further comprising creating the new snapshot of the database when a collective size of the deltas since a previous snapshot of the database was created exceeds a predetermined threshold.

10. A computing device, comprising:
a processor; and
a memory including computer readable instructions, which, when executed by the processor, cause the computing device to perform a method for updating database records while maintaining accessible temporal history, comprising:
receiving a request, at a database, to select an instance of a record from the database at a specific point in time;
reading the instance of the record from a snapshot of the database, wherein the snapshot of the database was made prior to the specific point in time;
loading one or more deltas associated with the record from the database, wherein each delta in the one or more deltas comprises a difference between a new state of the record and a prior state of the record;
chronologically applying the one or more deltas to the instance of the record to create the instance of the record;
returning the instance of the record;
determining that the request has made a percentage of recent requests exceed a threshold for requests for most-current data; and
creating a new snapshot of the database.

11. The computing device of claim 10, the method further comprising applying an update to the record by:
selecting a most recent instance of the record from the database;
determining a delta between the update to the record and the most recent instance of the record; and
saving in the database the delta between the update to the record and the most recent instance of the record.

12. The computing device of claim 11, wherein saving at the database the delta between the update to the record and the most recent instance of the record further involves additionally saving metadata associated with the update to the record.

13. The computing device of claim 12, wherein the metadata comprises an identifier for a client that requested the update to the record.

14. The computing device of claim 13, wherein saving at the database the delta between the update to the record and the most recent instance of the record further involves saving a time of the delta between the update to the record and the most recent instance of the record.

15. The computing device of claim 11, wherein saving at the database the delta between the update to the record and the most recent instance of the record further involves incrementing a count of deltas since a most recent snapshot of the database.

16. The computing device of claim 15, the method further comprising creating the new snapshot of the database when the count of deltas since the most recent snapshot of the database exceeds a predetermined threshold.

17. The computing device of claim 10, the method further comprising creating the new snapshot of the database when a predetermined amount of time has elapsed since a previous snapshot of the database was created.

18. The computing device of claim 10, the method further comprising creating the new snapshot of the database when a collective size of the deltas since a previous snapshot of the database was created exceeds a predetermined threshold.

19. A non-transitory computer readable medium comprising instructions, which when executed by a processor of a computing device, cause the computing device to perform a method for updating database records while maintaining accessible temporal history, comprising:
receiving a request, at a database, to select an instance of a record from the database at a specific point in time;
reading the instance of the record from a snapshot of the database, wherein the snapshot of the database was made prior to the specific point in time;
loading one or more deltas associated with the record from the database, wherein each delta in the one or more deltas comprises a difference between a new state of the record and a prior state of the record;
chronologically applying the one or more deltas to the instance of the record to create the instance of the record;
returning the instance of the record;
determining that the request has made a percentage of recent requests exceed a threshold for requests for most-current data; and
creating a new snapshot of the database.

20. The non-transitory computer readable medium of claim 19, the method further comprising applying an update to the record by:
selecting a most recent instance of the record from the database;
determining a delta between the update to the record and the most recent instance of the record; and
saving in the database the delta between the update to the record and the most recent instance of the record, wherein saving at the database the delta between the update to the record and the most recent instance of the record further involves additionally saving metadata associated with the update to the record, wherein the metadata comprises an identifier for a client that requested the update to the record, wherein saving at the database the delta between the update to the record and the most recent instance of the record further involves saving a time of the delta between the update to the record and the most recent instance of the record.

* * * * *